(12) United States Patent
Babcock et al.

(10) Patent No.: US 11,164,119 B2
(45) Date of Patent: Nov. 2, 2021

(54) SYSTEMS AND METHODS FOR ASSIGNING ROLES TO USER PROFILES FOR AN INCIDENT

(71) Applicant: MOTOROLA SOLUTIONS, INC., Chicago, IL (US)

(72) Inventors: Nathan Babcock, Tucson, AZ (US); Randy L. Ekl, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 307 days.

(21) Appl. No.: 15/393,022

(22) Filed: Dec. 28, 2016

(65) Prior Publication Data

US 2018/0181901 A1 Jun. 28, 2018

(51) Int. Cl.
*G06Q 10/06* (2012.01)
*G06F 3/0484* (2013.01)
*H04L 29/08* (2006.01)

(52) U.S. Cl.
CPC ... *G06Q 10/063112* (2013.01); *G06F 3/0484* (2013.01); *H04L 67/306* (2013.01)

(58) Field of Classification Search
CPC .......... G06Q 10/063112; G06F 3/0484; H04L 67/306
See application file for complete search history.

(56) References Cited

U.S. PATENT DOCUMENTS

| | | | |
|---|---|---|---|
| 6,304,864 B1 * | 10/2001 | Liddy | G06F 16/9535 706/15 |
| 9,424,532 B1 | 8/2016 | Abedini et al. | |
| 9,514,414 B1 | 12/2016 | Rosswog et al. | |
| 2002/0083059 A1 * | 6/2002 | Hoffman | G06Q 10/06 |
| 2004/0220894 A1 * | 11/2004 | Soluk | G06F 9/44505 706/50 |
| 2006/0117032 A1 * | 6/2006 | Dettinger | G06F 16/838 |

(Continued)

FOREIGN PATENT DOCUMENTS

WO 2017062684 A1 4/2017

OTHER PUBLICATIONS

Abbreviated Examination Report from the United Kingdom Intellectual Property Office for Application No. 1720232.6 dated May 18, 2018 (4 pages).

(Continued)

*Primary Examiner* — Pan G Choy
(74) *Attorney, Agent, or Firm* — Michael Best & Friedrich LLP

(57) ABSTRACT

Systems and methods are described for automatically assigning roles for an incident to user profiles using machine learning techniques to optimize the overall suitability of the automatic role assignments and to adapt to manual role reassignments. One or more roles of a plurality of roles for an incident are automatically assigned to each user profile of a plurality of user profiles by the computer-based system applying a combinatorial optimization routine. An indication is displayed on a screen of a determined relative suitability of a first user profile for each role of the plurality of roles. The computer-based system is configured to receive a manual reassignment selection of a different role of the plurality of roles to be assigned to the first user profile and the combinatorial optimization routine is updated based on the manual reassignment selection.

19 Claims, 13 Drawing Sheets

(56) References Cited

U.S. PATENT DOCUMENTS

| | | | | |
|---|---|---|---|---|
| 2012/0110087 | A1* | 5/2012 | Culver | G06Q 10/103 |
| | | | | 709/205 |
| 2013/0031034 | A1 | 1/2013 | Gubin et al. | |
| 2013/0083996 | A1 | 4/2013 | Prasad et al. | |
| 2013/0212703 | A1* | 8/2013 | Ramesh | G06Q 10/06393 |
| | | | | 726/28 |
| 2014/0095236 | A1* | 4/2014 | Podgurny | G06Q 10/06 |
| | | | | 705/7.14 |
| 2015/0356488 | A1* | 12/2015 | Eden | G06Q 10/06395 |
| | | | | 705/7.41 |
| 2017/0032279 | A1* | 2/2017 | Miserendino | G06N 5/04 |
| 2017/0323199 | A1* | 11/2017 | Wu | G06F 16/00 |
| 2017/0372232 | A1* | 12/2017 | Maughan | G06N 5/04 |
| 2018/0032997 | A1* | 2/2018 | Gordon | G06Q 30/0269 |

OTHER PUBLICATIONS

Weigel et al., "Coordinating Robots for Successful Soccer Playing," (2002) IEEE Transactions on Robotics and Automation, (18)5, 685-699.

Moskon, "Solving the Vaguely Defined Assignment Problems," specification (2011) International Journal of Mathematial Models and Methods in Applied Sciences, issue 4, vol. 5, pp. 773-780.

United Kingdom (UKIPO) Examination Report Under section 18(3) dated Aug. 23, 2019 for related UK Application No. GB1720232.6 (7 pages).

Great Brittan Examination Report under Section 18(3) dated Jan. 10, 2020 for related British Application No. 1720232.6.

* cited by examiner

SYSTEMS AND METHODS FOR ASSIGNING ROLES TO USER PROFILES FOR AN INCIDENT

BACKGROUND OF THE INVENTION

When an incident—for example, a fire, police, or medical emergency—occurs, certain roles may be assigned to different individuals. However, these roles are typically assigned manually in a process that can be slow, sub-optimal and error prone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
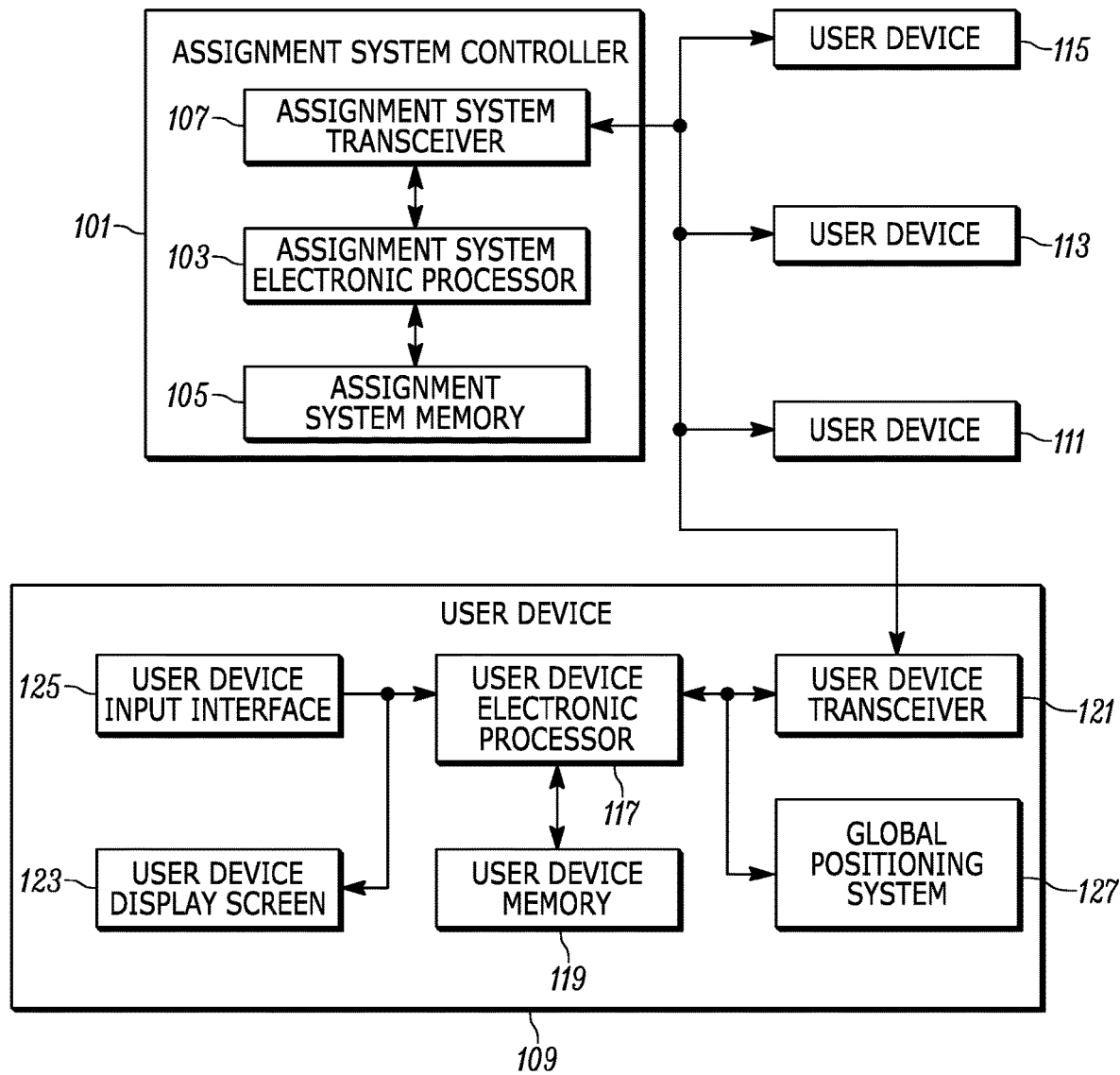
FIG. 1 is a block diagram of an incident management and communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Systems and methods described in this disclosure provide a computer-based mechanism for automatically assigning roles for an incident to user profiles using machine learning techniques to optimize the overall suitability of the automatic role assignments and to adapt to manual role reassignments. The computer-based system identifies a plurality of user profiles assigned to an incident and a plurality of roles required for the incident. One or more roles of the plurality of roles are automatically assigned to each user profile of the plurality of user profiles by the computer-based system applying a combinatorial optimization routine. An indication is displayed on a screen of a determined relative suitability of a first user profile for each role of the plurality of roles. The computer-based system is configured to receive a manual reassignment selection of a different role of the plurality of roles to be assigned to the first user profile and the combinatorial optimization routine is updated based on the manual reassignment selection. In some implementations, previous reassignments of the first user profile to a particular role of the plurality of roles will increase the determined relative suitability of the first user profile for that particular role and will increase the likelihood that the particular role will be automatically assigned to the first user profile. Also, in some implementations, the user profiles assigned to the incident may include the plurality of user profiles that are each assigned one or more roles of the plurality of roles and one or more additional user profiles that are not assigned any role for the incident.

FIG. 1 is a block diagram of one example of an incident management and communication system 100. An assignment system controller 101 includes an assignment system electronic processor 103 and an assignment system memory 105. The assignment system electronic processor 103 includes one or more electronic logic processors including, for example, a microprocessor. The assignment system memory 105 is a non-transitory computer-readable memory that stores data and executable instructions. The assignment system electronic processor 103 in this example is configured to access the instructions stored on the assignment system memory 105 and to execute the accessed instructions to provide the functionality of the assignment system controller such as described in this disclosure. In other implementations, the assignment system controller 101 can be implemented in whole or in part by an electronic logic device configured to provide system functionality, for example, by executing instructions stored on memory (e.g., a microprocessor), through hardware (e.g., an application specific integrated circuit), or a combination of executable software and hardware circuitry.

In the example of FIG. 1, the assignment system controller 101 also includes an assignment system transceiver configured to communicate with a plurality of user devices including user device 109, user device 111, user device 113, and user device 115. The user device 109 includes a user device electronic processor 117 and a user device memory 119. The user device electronic processor 117 executes instructions stored on the non-transitory computer-readable memory of user device memory 119 to provide the functionality of the user device 109 including the specific functionality described in this disclosure. The user device 109 also includes a user device transceiver 121 for communicating with the assignment system controller 101 and, in some implementations, with the other user devices (i.e., user device 111, user device 113, and user device 115). The user device 109 also includes a user device display screen 123 and a user device input interface 125. In some implementations, the user device display screen 123 and the user device input interface 125 are provided as a touch-sensitive display screen while, in other implementations, the user device input interface 125 may be provided as another type of input device including, for example, a keyboard or a mouse. The other user devices (i.e., user device 111, user device 113, and user device 115) in the example of FIG. 1 are configured similarly to and include the same components as illustrated in reference to user device 109.

In several of the examples discussed in this disclosure, the user devices of FIG. 1 (user device 109, user device 111, user device 113, and user device 115) are provided as portable computing and communication devices including, for example, a smart phone, a tablet computer, or a land-mobile radio device and the assignment system controller 101 is provided as a remote server connected to the user devices through the Internet or other communications network. However, other configurations and hardware implementations are possible. For example, in some other implementations, the functionality described herein as being provided by the assignment system controller 101 may instead be implemented as a software application running on one of the user devices (e.g., user device 109). In still other implementations, the assignment system controller 101 may be implemented as a desktop computer that is further configured to output an automatic role assignment information and receive manual role reassignment inputs through a user interface of the desktop computer. Similarly, in some implementations, the assignment system controller 101 may be provided as a plurality of different electronic processors or computer systems providing the functionality of the assignment system controller 101 in a cloud-computing or "fog-computing" environment.

In the example of FIG. 1, the user devices (user device 109, user device 111, user device 113, and user device 115) are utilized by personnel (or "users") assigned to an incident such as, for example, a police, fire, or medical emergency. A user profile is associated with each user device, for example, by entering log-in credentials. When a new incident is created, a number of user profiles are assigned to the incident as the incident team. The incident management and communication system 100 is configured to define a set of required roles for the incident based on information such as the incident type, the size of the incident (number of public safety staff deployed or geographic area), the severity of the incident, and the location of the incident. For example, if the incident type is an armed intruder situation, the incident management and communication system 100 may be configured to require an incident commander, two SWAT officers, a negotiator, and a perimeter officer.

The assignment system controller 101 is configured to automatically assign at least one of the required roles for the incident to each user profile that has been assigned to the incident by applying a combinatorial optimization routine. In some implementations, the assignment system controller 101 is configured to determine (e.g. calculate) a "suitability score" for each user profile assigned to the incident for each role in the incident and then assigns roles to each of the user profiles in order to maximize the total suitability score for the incident (e.g., the sum of the suitability score for the user profile assigned to each role in the incident). In some implementations, the automatic assignments are then displayed to an incident manager or to the assigned incident commander who is then given the option to accept the automatic assignments or to manually reassign one or more of the roles to a different user profile. Furthermore, in some implementations, the assignment system controller 101 can be configured to include a machine learning mechanism that is retrained by the manual reassignment of roles such that, in future incidents, the assignment system controller 101 will be more likely to automatically assign a particular user profile to a particular incident role.

Figure 2:
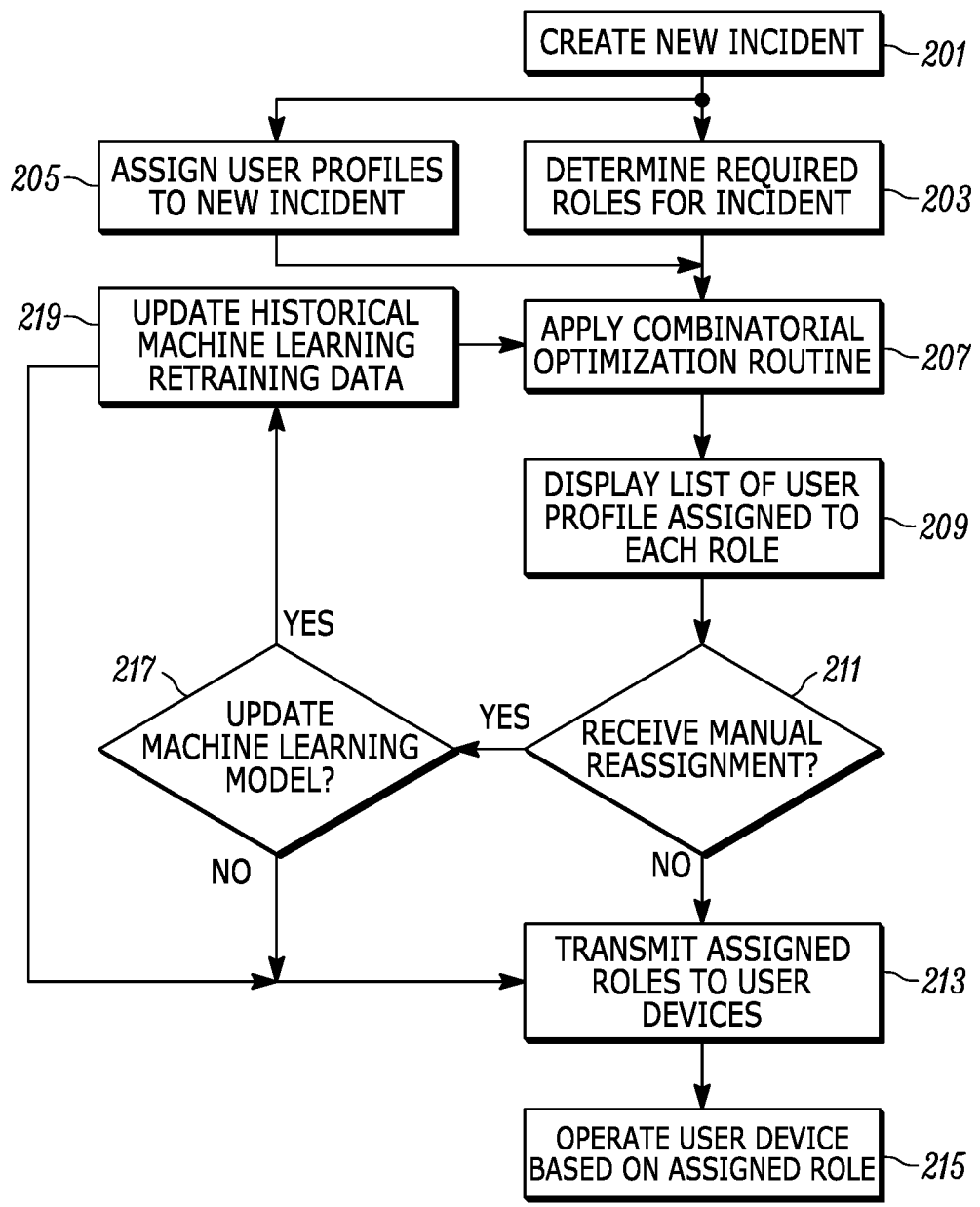
FIG. 2 is a flowchart of a method of assigning roles for a new incident to user profiles using the system of FIG. 1 in accordance with some embodiments.

FIG. 2 illustrates an example of a method for assigning roles for an incident to user profiles in the incident management and communication system 100 of FIG. 1. First, a new incident is created at block 201 by defining an incident type and, in some implementations, other relevant information regarding the nature of the incident. Based on the created incident, the assignment system controller 101 determines a set of required roles for the incident at block 203. Multiple user profiles are then assigned to the incident either manually or automatically at block 205. The assignment system controller 101 then applies the combinatorial optimization routine at block 207. At block 209, a list of the user profiles and the roles assigned to each user profile are displayed. In some implementations, this list is displayed only on the user device that was used to initiate or create the new incident. In other implementations, the list is displayed on the user device associated with the user profile for the incident commander. In still other implementations, the list is displayed on all user devices associated with user profiles that have been assigned to the incident as discussed in further detail below.

In some implementations, the user interface of the user device (e.g., user device 109) displays a prompt instructing the user to either accept the automatic role assignments or to enter a manual reassignment of one or more roles for the incident. In other implementations, a prompt is not displayed and the system operates based on the automatic role assignments as long as no manual reassignments are received through the interface. If the automatically assigned roles are accepted without any manual reassignment (at block 211), then the assigned roles are transmitted to the user devices (e.g., user device 109, user device 111, user device 113, and user device 115) associated with each user profile assigned to the incident at block 213. In some implementations, each user device (e.g., user device 109, user device 111, user device 113, and user device 115) is configured to operate differently based on the role that has been assigned to a user profile associated with the user device (e.g., user device 109, user device 111, user device 113, and user device 115) at block 215. For example, user devices that are associated with user profiles that have been assigned the role of SWAT officer may be automatically added to a SWAT team talk group for the incident while a user device associated with a user profile that has been assigned the perimeter officer role may automatically output a map of the area on the display of the user device.

However, if one or more of the roles have been reassigned, the user device (e.g., user device 109) will display a prompt asking if the machine learning model should be updated based on the manual reassignment at block 217. In some implementations, the machine learning model is implemented as a neural network framework that is configured to update based on manual role reassignments such that, when roles are assigned in future incidents, it is more likely that the user profile in question will be automatically assigned to the role that was manually reassigned to the user profile in the current incident. Other implementations may employ types of machine learning other than neural networks including, for example, Genetic Algorithms, Deep Learning, Evolutionary Programming, and other modern techniques.

If the user device 109 receives an input instructing the system to retrain the machine learning model based on the manual role reassignment at block 217, then the historical machine learning retraining data stored on the assignment system memory 105 is updated to reflect the manual reassignment at block 219. In some implementations, updating the historical machine learning retraining data includes adding new data, removing old or conflicting data, or a combination of adding and removing data. This stored historical machine learning retraining data will then be used by the combinatorial optimization routine in the automatic assignment of roles for future incidents. Conversely, a user may choose to not update the machine learning model based on the manual role reassignment for any of a variety of reasons. For example, a user may choose to reassign a role due to temporary circumstances (e.g., a broken leg of a person associate with a particular user profile) that should not be given weight in future automatic role assignments. In either case, the role assignments for the incident—including the manually reassigned roles—are transmitted to the user devices at block 213 and the user devices operate based on the assigned role for the user profile associated with the particular user device at block 215.

Figure 3:
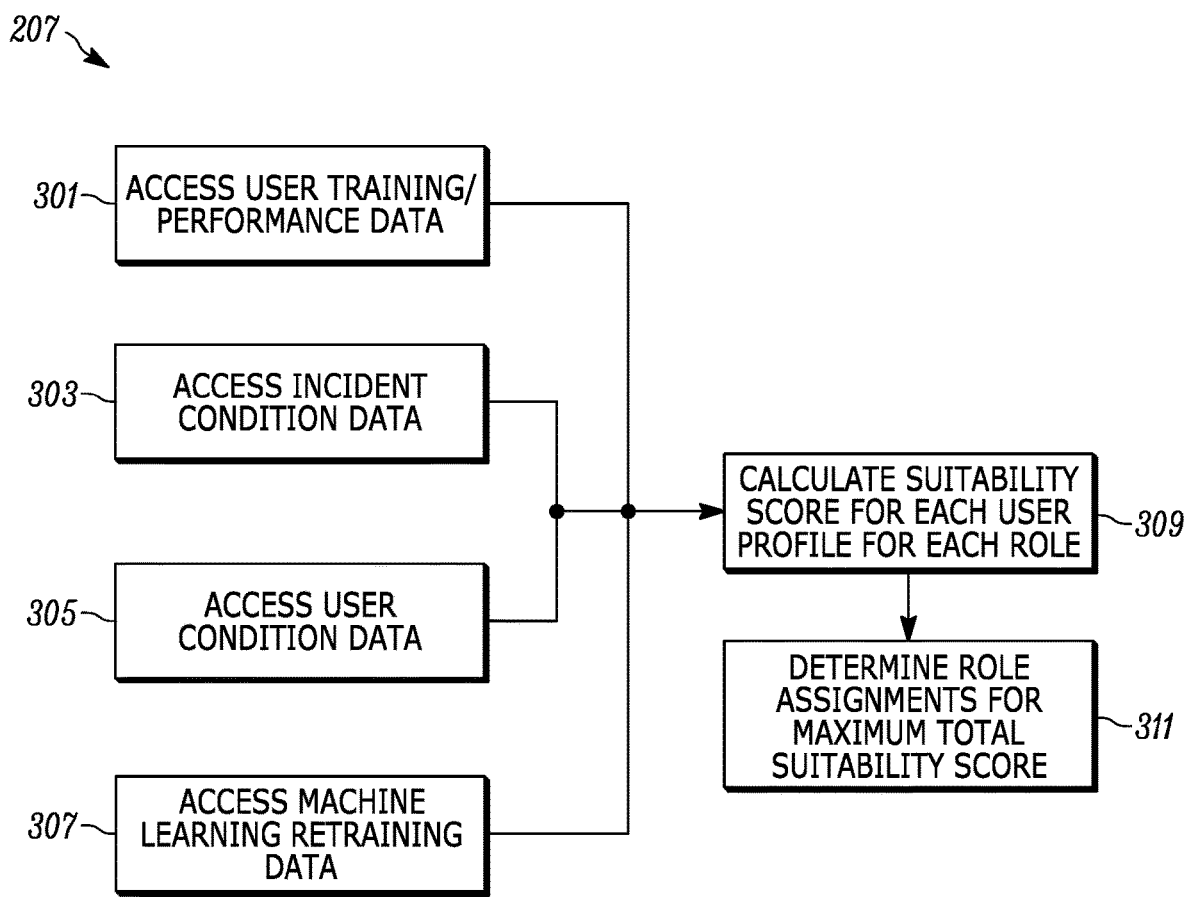
FIG. 3 is a flowchart of one example of a combinatorial optimization routine used to optimize role assignments in the method of FIG. 2 in accordance with some embodiments.

FIG. 3 illustrates one specific example of a combinatorial optimization routine that can be implemented by the assignment system controller 101 at block 207 of the method of FIG. 2. In this example, the assignment system controller 101 access user training and performance data associated with each user profile at block 301, accesses incident condition data (including, for example, weather information) at block 303, access user condition data (including, for example, current medical or health information or other information that may affect a particular person's ability to perform a role for the incident) at block 305, and accesses historical machine learning retraining data from prior manual role reassignments and prior accepted automatic role assignments for a particular user profile at block 307. Based on this information, the assignment system controller 101 calculates a suitability score for each user profile for each role at block 309 and determines a combination of role assignments that achieves a maximum total suitability score for the incident at block 311.

Although the specific method illustrated in FIG. 3 will ultimately find the optimized combination of role assignments, it requires a relatively large number of calculations because it checks every possible combination of user profile and role for a given incident. By applying a recursive technique such as, for example, the Hungarian method, as described in detail below, the assignment system controller 101 is able to more quickly converge on an optimized combination of role assignments without checking every combination of user profile and role.

Also, the method illustrated in FIG. 3 is just one example of how the assignment system controller 101 might be configured to automatically assign roles. Other implementations may employ other methods and formulas. For example, although the method of FIG. 3 identifies a set of assignments that results in a maximum sum of the suitability scores, other implementations may identify an optimized set of role assignments based, for example, on a sum of suitability scores minus the standard deviation, a minimum value of the set of suitability scores, a product of the suitability scores, or other more complex functions or formulas.

Figure 4:
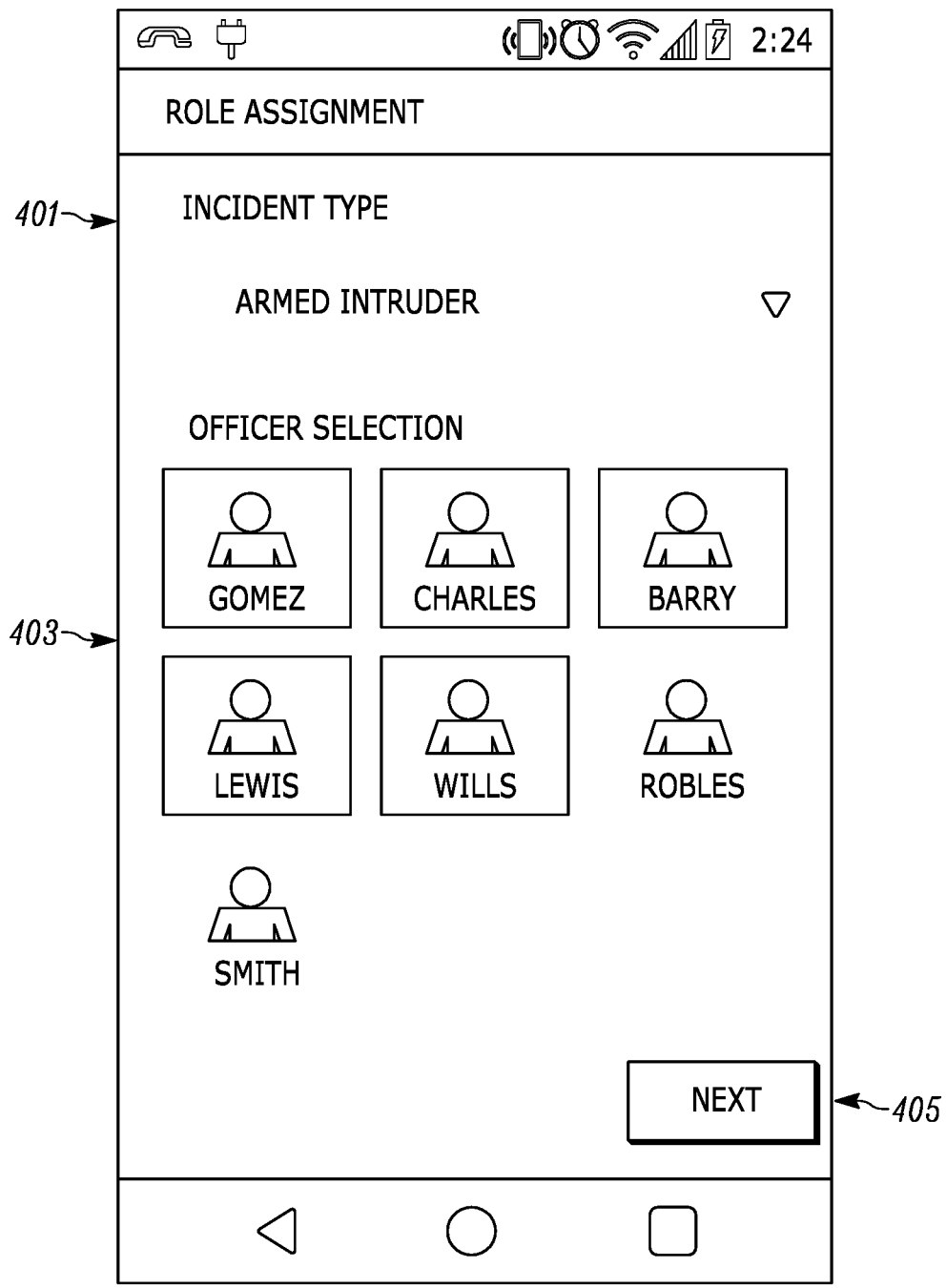
FIG. 4 is a screen shot of a user interface used to select user profiles to be assigned to an incident in accordance with some embodiments.
Figure 5A:
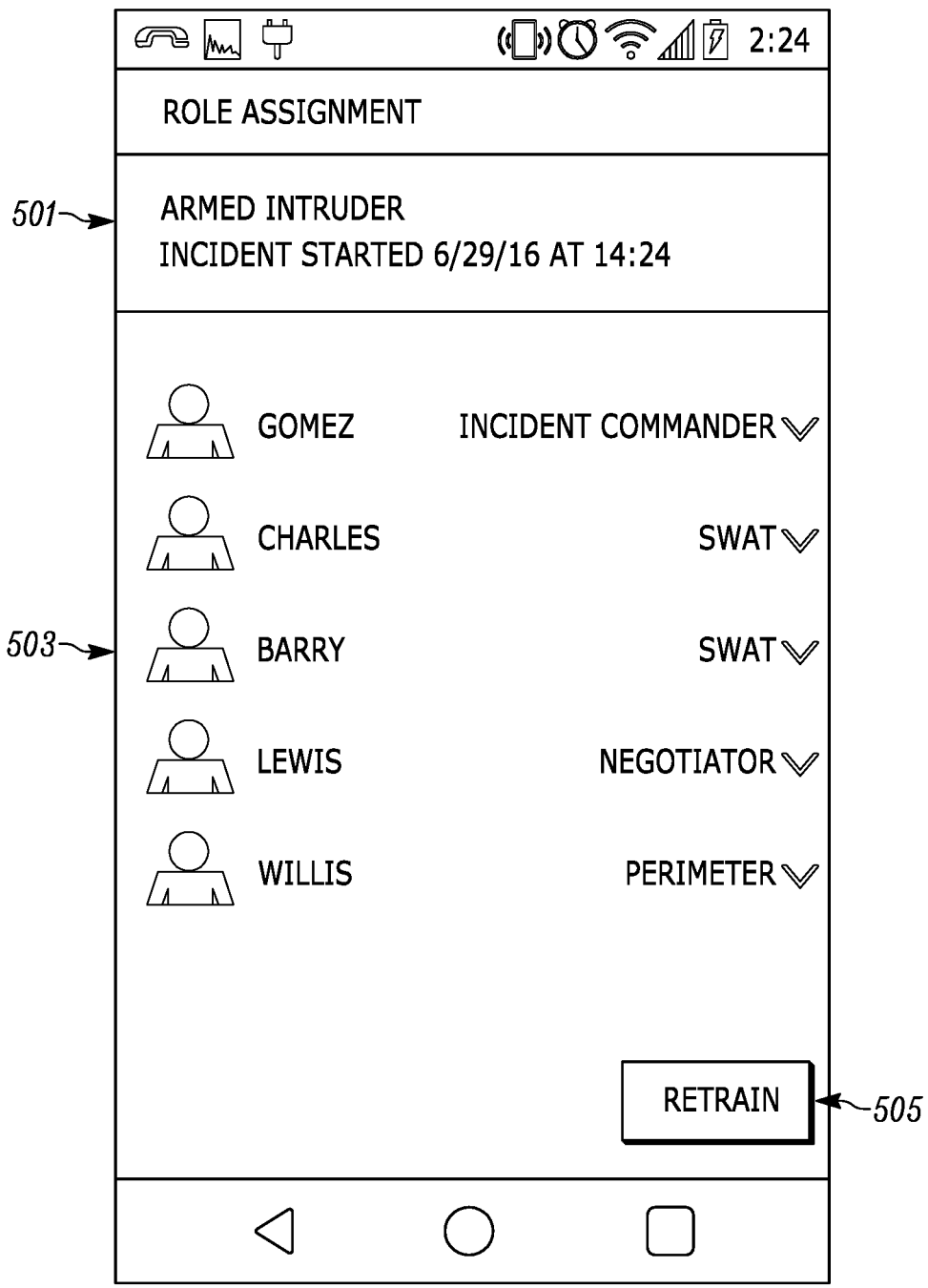
FIGS. 5A and 5B are screen shots of a user interface showing role assignments for an incident in accordance with some embodiments.
Figure 5B:
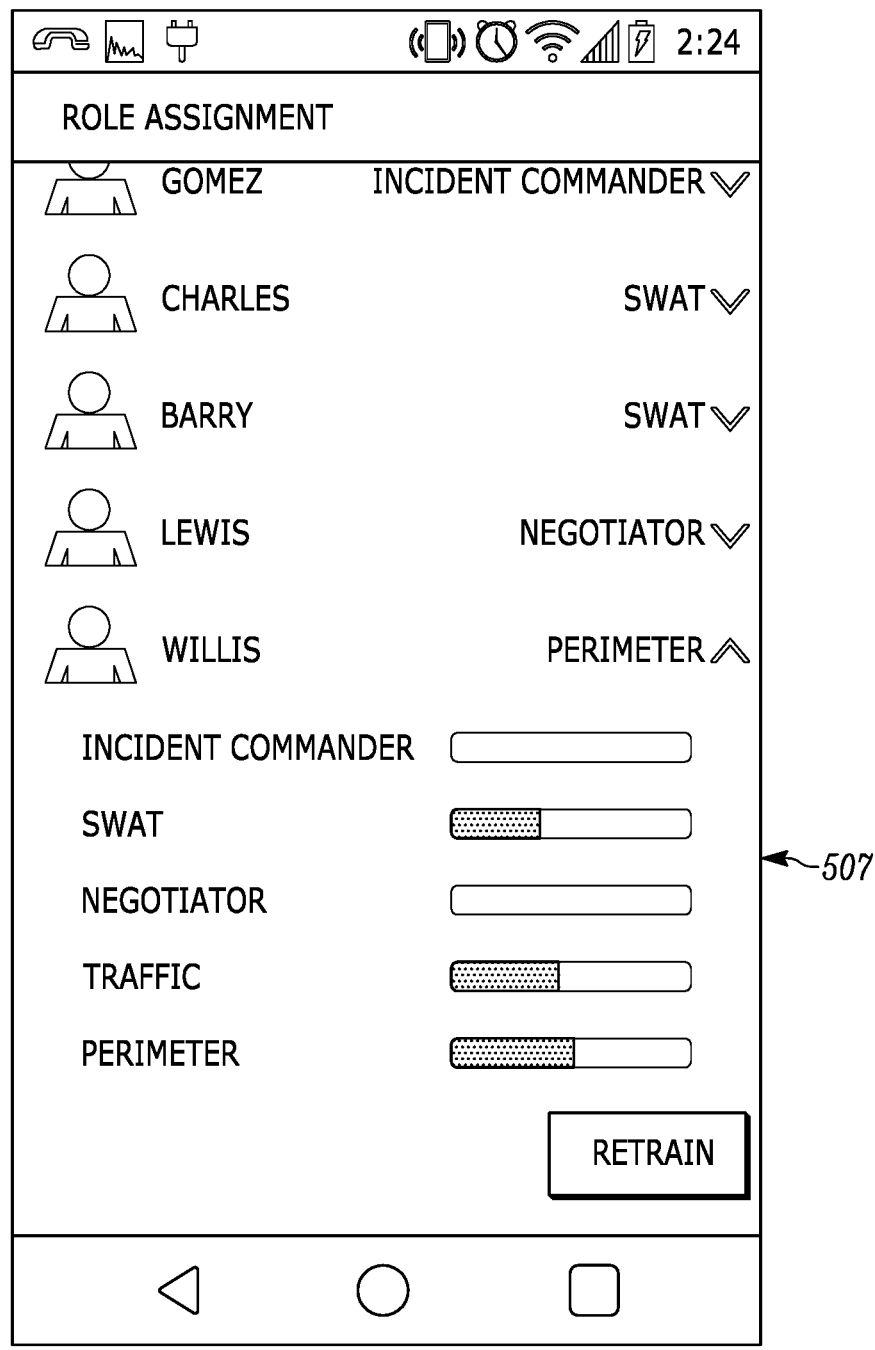

FIGS. 4, 5A, and 5B illustrate an example of a user interface that may be displayed by the user device 109 during the method of FIG. 2. In FIG. 4, the user interface displays a drop-down list 401 including a plurality of different incident types and a series of icons 403 indicative of available user profiles that can be assigned to the new incident. To add a user profile to the incident, the user selects the icon corresponding to the user profile which remains highlighted to indicate the selection. A "next" button 405 is also displayed on the user interface to be pressed by a user after the user profiles have been selected to be assigned to the incident.

After the "next" button 405 has been pressed, the user interface of FIG. 5A is output on the user device display screen 123. The user interface of FIG. 5A shows the selected incident type in field 501. In some implementations, field 501 also displays other information about the incident including, for example, the date and time on which the incident was started as shown in the example of FIG. 5A.

The user interface of FIG. 5A also shows a list 503 of all of the user profiles that were selected for the incident in the user interface of FIG. 4 and the roles that have been automatically assigned to each user profile using the combinatorial optimization routine at block 207 of FIG. 2. The elements on the list are expanded in response to receiving a user input selecting one of the user profiles. As shown in FIG. 5B, when a particular user profile from the list 503 is expanded, the user interface displays a sub-list 507 showing all of the potential roles for the incident and displaying a visual indication of a relative suitability of the selected user profile for each role.

In the particular example of FIG. 5B, the visual indication of relative suitability for the role is shown as a bar graph and the role that is current assigned to the user profile for "Willis" is highlighted. In this example, the user profile for "Willis" was automatically assigned the role of "Perimeter Officer." However, the visual indicators of relative suitability indicate that the user profile for "Willis" was almost equally suitable for the role of SWAT officer or Traffic Officer. A selection of one of the other roles displayed in the sub-list 507 will cause the user device 109 to highlight the newly selected role and to manually reassign the newly selected role to the "Willis" user profile. A selection of the "Retrain" button 505 will cause the user device 109 to instruct the assignment system controller to update the historical machine learning retraining data based on the manual role reassignment.

In some implementations, the user device 109 is configured to update the automatic role recommendations for one or more other user profiles displayed in the list 503 in response to receiving a manual selection of another role for a particular user profile in the sub-list 507. For example, if an input is received changing the role assigned to the "Willis" user profile from "Perimeter" to "Traffic," the user device 109 will update the user interface to highlight the "Traffic" role in the sub-list 507 instead of the "Perimeter" role and will also change the role displayed in the list 503 for one or more of the other user profiles to achieve a combination of role assignments with the highest possible suitability score in view of the manual role reassignment received for the "Willis" user profile. In some implementations, the information required to provide this updated role assignment for the other user profiles was previously generated as part of the earlier combinatorial optimization routine. However, in other implementations, the user device 109 is configured to transmit a message to the assignment system controller 101 indicating that a role has been manually reassigned for one of the user profiles and instructing the assignment system controller 101 to reapply the combinatorial optimization routine for the other user profiles and the remaining roles for the incident. If the roles assigned to more than one user profile have been manually changed, then user device 109 and the assignment system controller 101 only automatically update the suggested role assignments for the remaining user profiles based on the remaining roles for the incident that have not been manually assigned.

The graphical user interfaces illustrated in FIGS. 4, 5A, and 5B are only one example and other user interfaces can be used to implement the automatic role assignment mechanism. For example, although the visual indication of the determined relative suitability of a user profile for each role of the plurality of roles is shown in the example of FIG. 5B as a series of bar graphs, in other implementations, this visual indication may be provided by other mechanisms including, for example, numeric text. In other implementations, the system may be configured to provide the visual indication using colors, emojis, other iconography, or other graphical symbols.

The example illustrated in FIGS. 4, 5A, and 5B provides the automatic assignment of roles as a two-step process from the perspective of a user. First, the user selects the user profiles to be assigned to the incident using the graphical user interface of FIG. 4 and, after the "Next" button 405 is selected, the automatic role assignments are displayed and presented for manual reassignment. However, in other implementations, the graphical user interface is configured to combine the user-input functions of FIG. 4 and FIGS. 5A and 5B into a single graphical user interface. In some such implementations, the assignment system controller 101 calculates optimized role assignments as individual user profiles are selected. When as user profiles are subsequently selected and deselected, the assignment system controller 101 recalculates an optimized role assignments based on the updated list of user profiles assigned to the incident and displays the automatic role assignments on the screen.

Figure 6:
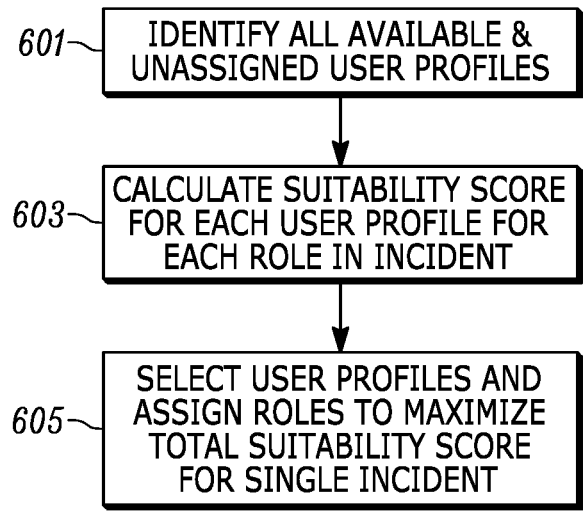
FIG. 6 is a flowchart of a method of assigning user profiles to an incident and assigning roles to user profiles in order to maximize a total suitability score for a single incident in accordance with some embodiments.

Furthermore, although the example illustrated in FIGS. 4, 5A, and 5B shows user profiles being added to an incident based on a manual selection of user profiles through the graphical user interface of FIG. 4, in other implementations, the user profiles may be automatically assigned to a newly created incident. FIG. 6 illustrates one example of a method for automatically assigning user profiles to a new incident. First, the user profiles are identified that correspond to all of the available and unassigned persons that might be assigned to a newly created incident at block 601. The assignment system controller 101 calculates a suitability score for each user profile for each role in the incident at block 603. Based on this information, the assignment system controller 101 automatically selects both a combination of user profiles to assign to the incident and a combination of role assignments that will attain a maximum total suitability score for the newly created incident at block 605. Again, in some implementations, the assignment system controller 101 is configured to assign user profiles to specific roles in the incident by applying a recursive technique such as the Hungarian method.

Figure 7:
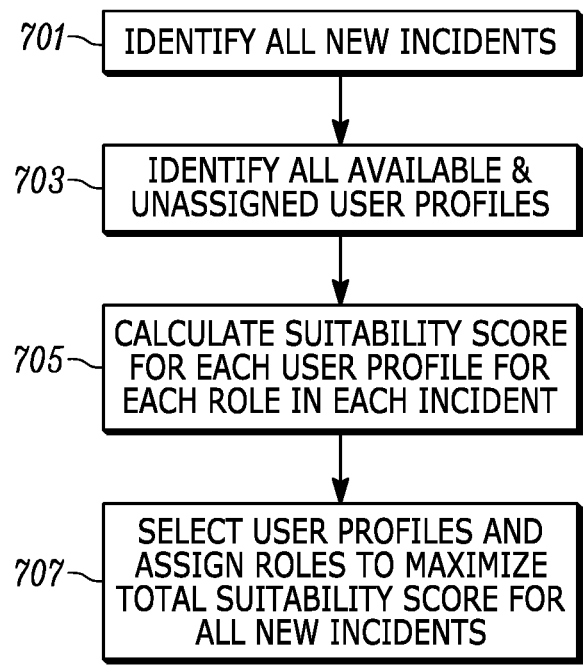
FIG. 7 is a flowchart of a method of assigning user profiles to multiple new incidents and assigning roles to user profiles in order to maximize an average total suitability score for all of the new incidents in accordance with some embodiments.

Although the method of FIG. 6 will attain a maximum total suitability score for a single newly created incident, it will remove the assigned user profiles from the pool of available user profiles that can be assigned to other new incidents. Therefore, in some implementations, the assignment system controller 101 is configured to generate new incidents in batches and to determine a combination of user profile assignments to specific new incidents that will maximize the average total suitability score for all of the new incidents. FIG. 7 illustrates one example of such a technique. First, the assignment system controller 101 identifies all new incidents that are being created at block 701 and identifies all available & unassigned user profiles at block 703. The assignment system controller 101 then calculates a suitability score for each user profile for each role in each incident at block 705 and automatically determines both a combination of user profiles to assign to each of the new incidents and a combination of role assignments in each incident that will attain a maximum average total suitability score for all of the newly created incidents at block 707. Again, in some implementations, the assignment system controller 101 is configured to assign user profiles to specific roles in specific tasks using a recursive technique such as the Hungarian method. Also, in some implementations, the assignment system controller 101 may be configured to use other criteria for determining an optimized assignment of roles and user profiles across multiple incidents. For example, instead of determining a set of assignments that achieves the maximum average total suitability score, the assignment system controller 101 may be configured to determine a set of assignments that achieves a highest minimum suitability score across the multiple incidents.

In the examples of FIGS. 5 and 6, only available and unassigned user profiles are considered for assignment to a newly created incident. Once a user profile has been assigned to an active and ongoing incident, reassigning that user profile to a different incident or even to a different role within the same incident can have a negative effect on the incident in terms of lost time and efficiency while transitioning the role to a new user profile and other factors such as travel time from the current incident to a new incident. However, despite these potential inefficiencies, the qualifications of a particular user profile for a particular role in a new incident may be significant enough to overcome the detriments associated with reassigning that user profile from another ongoing incident.

Figure 8:
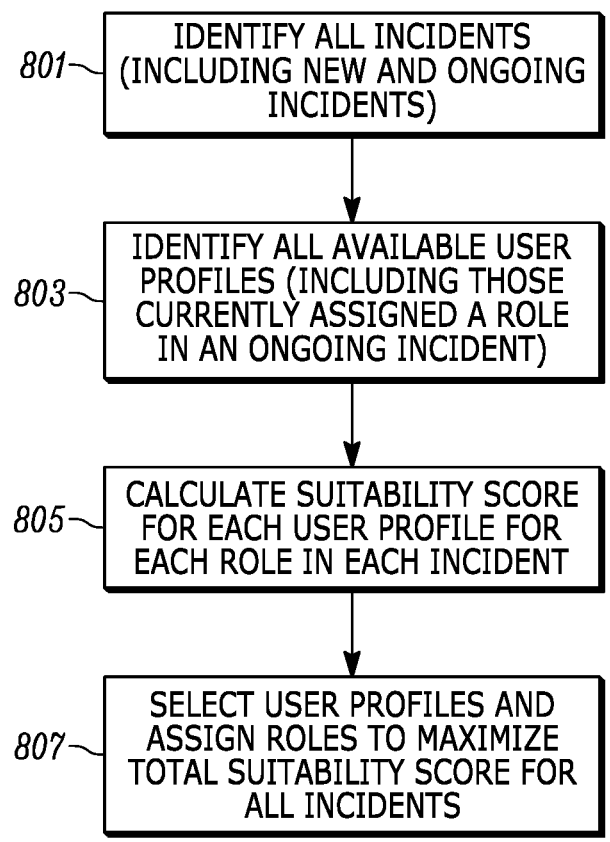
FIG. 8 is a flowchart of a method of assigning and reassigning user profiles to multiple new and ongoing incidents and assigning and reassigning roles to user profiles in order to maximize an average total suitability score for all new and ongoing incidents in accordance with some embodiments.

FIG. 8 illustrates one example of a method for assigning user profiles to roles in a newly created incident that also considers user profiles that have already been assigned to another active and ongoing incident. First, the assignment system controller 101 identifies all incidents including new incidents and ongoing incidents at block 801 and identifies all available user profiles at block 803 (including user profiles that are not yet assigned to any role or incident and user profiles that are currently assigned to a role in an ongoing incident). The assignment system controller 101 then calculates a suitability score for each user profile for each role in each incident at block 805.

In the method of FIG. 8, the current geographic location of a user associated with a user profile and the costs associated with reassigning a role that is current assigned to the user profile are considered in calculating the other suitability scores for a particular user profile. In some implementations, the current geographic location of the user associated with the user profile can be determined based on information stored in the user profile (e.g., a location of an incident to which the user profile is currently assigned) while, in other implementations, the current geographic location is determined based on a determined geographic location of the communication device that is currently associated with the user profile (e.g., by using a global positioning system receiver in the communication device).

Accordingly, the suitability score calculated for a user profile to continue in the same role and incident to which the user profile is already currently assigned would be higher than if the suitability score were calculated for that same user profile in the same role in a newly created incident. Conversely, the suitability score calculated for the user profile to be reassigned to a different role and/or a different incident will be lower than if the suitability score were calculated for that same user profile in the same role in a newly created incident.

Based on the calculated suitability scores, the assignment system controller 101 automatically determines both a combination of user profiles to assign to each of the new incidents and a combination of role assignments in each incident that will attain a maximum average total suitability score for all of the incidents, including all newly created incidents and all ongoing incidents, at block 807. Again, in some implementations, the assignment system controller 101 is configured to assign user profiles to specific roles in particular tasks using a recursive technique such as the Hungarian method.

In the examples discussed above, each user profile assigned to an incident is generally assigned only a single role for that incident. However, in some implementations, multiple roles may be assigned to a single user profile due, for example, to a limited number of available user profiles or a potential efficiency achieved by a dual role assignment.

Figure 9:
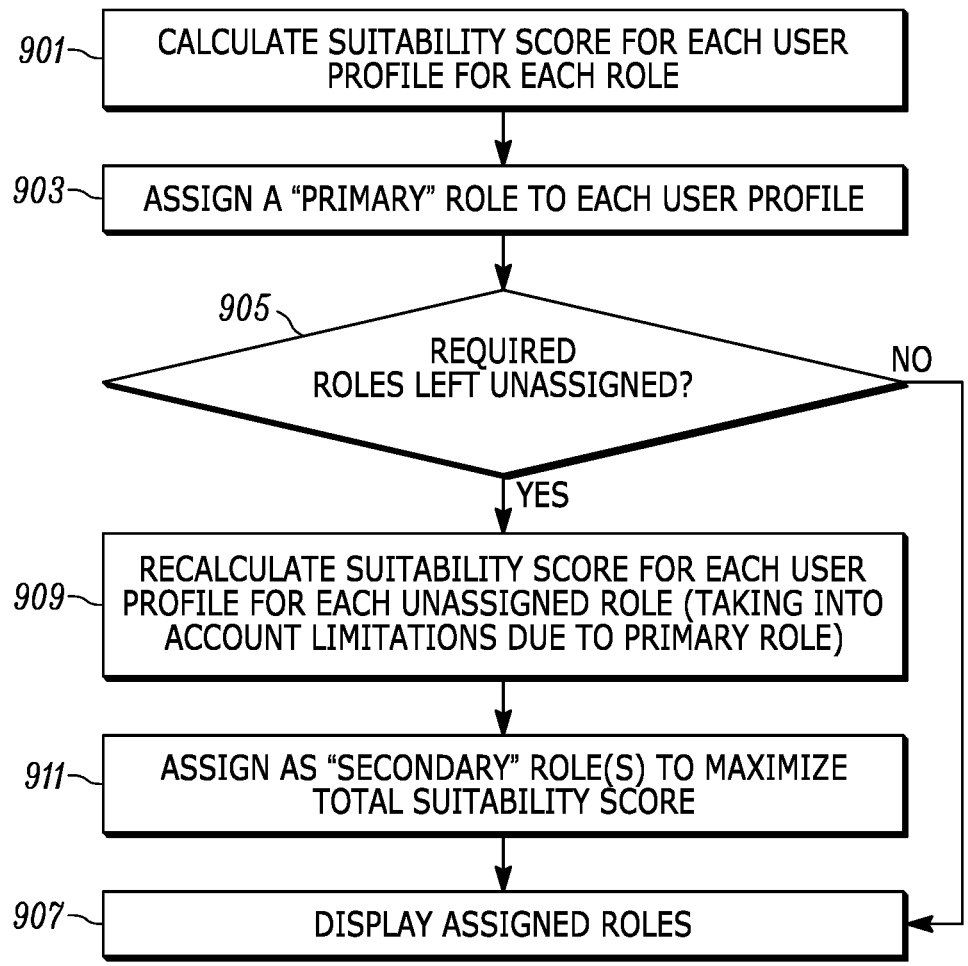
FIG. 9 is a flowchart of a method of assigning a primary role and a secondary role to one or more individual user profiles where a total number of user profiles assigned to an incident is less than a total number of required roles for the incident in accordance with some embodiments.

FIG. 9 illustrates an example of a method implemented by the incident management and communication system 100 that determines when and how to assign multiple roles to a single user profile in an incident. First, the assignment system controller 101 calculates a suitability score for each user profile assigned for each role in the incident at block 901 and assigns a "primary" role to each user profile at block 903. The assignment system controller 101 then, at block 905, determines whether there are any roles for the incident that are left unassigned after "primary" roles have been assigned to each user profile. If not, then the assignment system controller 101 outputs a list of the user profiles and the corresponding assigned "primary" roles to be displayed (e.g., on the user device display screen 123) at block 907. However, if there are roles that are left unassigned, after "primary" roles are assigned to each user profile, then the assignment system controller 101 recalculates a suitability score for each user profile for each unassigned role at block 909 taking into account limitations due to the primary assigned role.

The suitability score for a particular user profile will generally be lower for a particular role if the role is considered as a "secondary" role because the user associated with the user profile may presumably be less capable of fulfilling the tasks and responsibilities associated with the role as a "secondary" role due to their now-existing expectation to fulfill the tasks and responsibilities associated with the assigned "primary" role. Furthermore, in some particular cases a particular "primary" role assignment will cause a user profile to be entirely disqualified for a particular "secondary" role. For example, a user profile that has been assigned a "primary" role of "helicopter pilot" would not be able to accept a "secondary" role as a "SWAT officer" and, therefore, the suitability score calculated at block 909 would be zero.

Once suitability scores are calculated for each user profile for the "secondary" roles, the assignment system controller again assigns roles to maximize the total suitability score for the incident including combinations of primary and secondary roles for a particular user at block 911. A list of user profiles, including the assigned "primary" roles and any assigned "secondary" roles is then displayed on the user device display screen 123 at block 907 where the user is able to accept the automatic assignment or manually reassign one or more "primary" or "secondary" roles.

In some implementations, this second application of the combinatorial optimization routine at block 909 and block 911 in FIG. 9 may cause the assignment system controller 101 to alter its automatic assignment of "primary" roles for the incident. For example, the assignment system controller 101 may determine that, by assigning a primary role to a user profile that achieves a slightly lower suitability score for the primary role assignments, it is able to achieve a significantly higher suitability score for the assigned secondary role. In some implementations and in some situations, this may be because a particular user profile is better suited to a particular "secondary" role than the other users assigned to the incident or because certain combinations of roles may be better suited for dual assignment to a single user profile. For example, in some incidents, the responsibilities associated with a role such as "reserve SWAT officer" may significantly overlap with the responsibilities associated with the role of "perimeter observation officer." Therefore, the assignment controller system 101 may determine through the second iteration of the combinatorial optimization routine that the total suitability score for the incident can be maximized by assigning these two roles to the same user profile as a "primary" role and "secondary" role.

Figure 10:
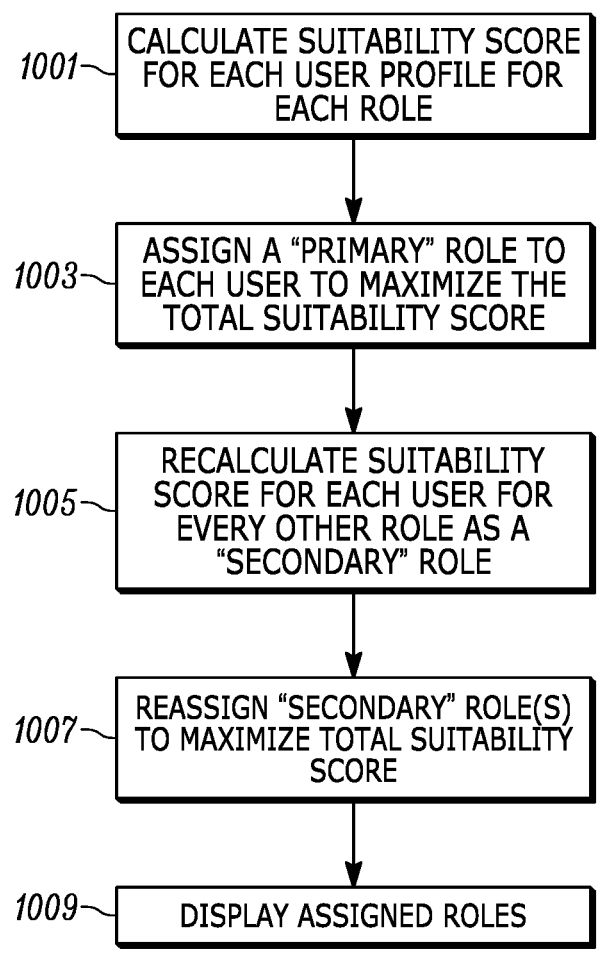
FIG. 10 is a flowchart of a method of assigning a primary role and a secondary role to one or more individual user profiles to maximize the total suitability score for the incident in accordance with some embodiments.

Similarly, in some implementations and some situations, the total suitability score for an incident might be improved by assigning two particular roles to the same user profile instead of assigning the roles to two different user profiles—thereby reducing the total number of user profiles required for the incident. FIG. 10 illustrates an example of a method implemented by an assignment system controller 101 configured to provide this type of optimization. First, the assignment system controller 101 calculates a suitability score for each user profile for each role at block 1001 then recalculates a suitability score for each user for every other role as a "secondary role" taking into account each potential "primary" role that might be assigned to that user profile at block 1005. The assignment system controller 101 then assigns a "primary" role, a combination of "primary" role and "secondary" role, or no role to each user profile in order to maximize the total suitability score for the incident at block 1007. A list of the user profiles assigned to the incident and any assigned role or roles for the incident are then displayed on the user device display screen 123 at block 1009.

It is noted that, in some configurations, when applying the method of FIG. 10, some user profiles that have been assigned to a particular incident will not be assigned any particular role for the incident through the automatic assignment process. In some implementations, user profiles that are not assigned any role for the incident will either be released back into the pool of available user profiles for other incidents or may be assigned to the incident in a reserve or back-up role.

In some implementations, the assignment system controller 101 can also be configured to respond to real-time changes in an incident by recalculating the automatic role assignments based on new developments or new information and to output a recommended role reassignments if necessary and appropriate. For example, a SWAT officer or fire fighter might be injured during an incident and, as a result, a new role may be created (e.g., a medical officer required to attend to the injured person) and/or another user profile might need to be reassigned to the role that is vacated by the injured person. Similarly, the incident type might change during management of the incident. For example, a traffic collision may develop into an assault due to a confrontation between two drivers involved in the original traffic collision. The assault incident may require different roles than the original traffic collision incident and/or different role assignments for the same set of user profiles may be better suited for different roles due to the new incident type. Again, the assignment system controller 101 may be configured to consider any costs or inefficiencies involved in changing the role of a particular user profile during an ongoing incident in determining a suitability of the particular user profile for a reassigned role.

Figure 11:
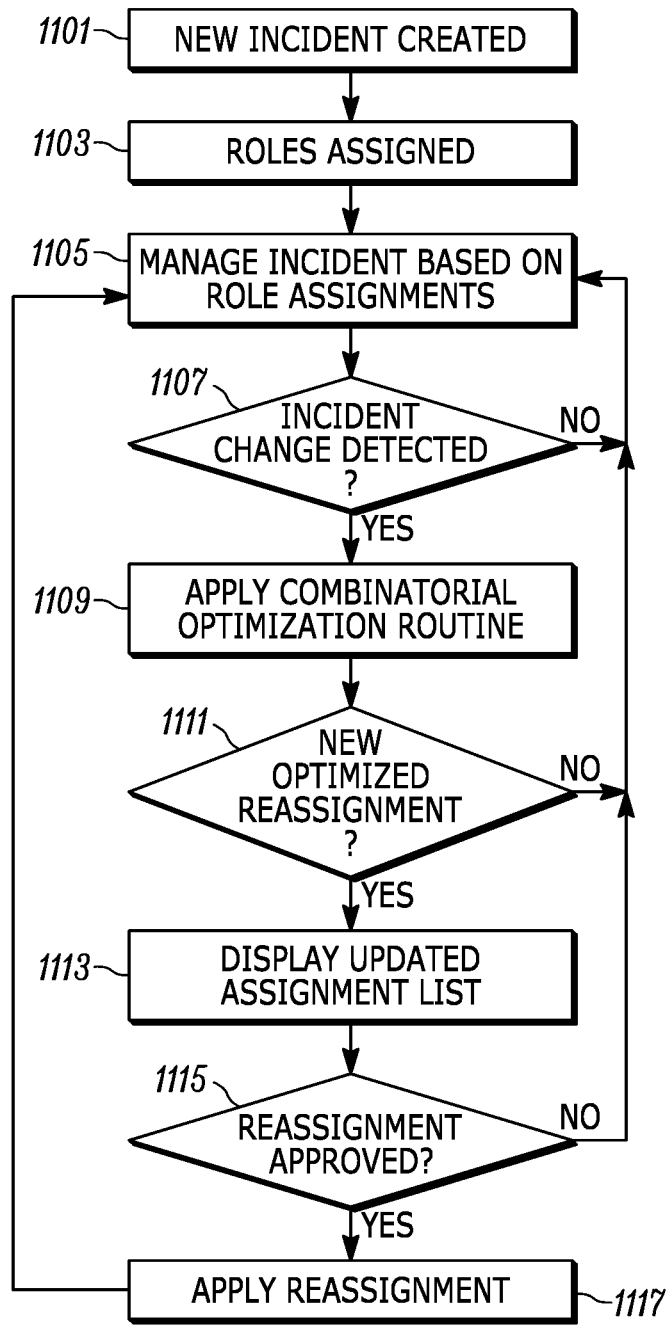
FIG. 11 is a flowchart of a method of reassigning roles to one or more user profiles in response to real-time changes in the incident in accordance with some embodiments.

FIG. 11 illustrates an example of a method implemented by an assignment system controller 101 configured to provide real-time role reassignment suggestions. A new incident is created at block 1101 and roles are assigned at block 1103, for example, as described in one or more of the previous examples. The user devices operate according to the role assigned to the user profile associated with the user device at block 1105. The assignment system controller 101 is configured to monitor various information sources for signals, data, or messages indicative of changes in the incident. For example, the assignment system controller 101 may periodically monitor a weather system for changes in weather at the incident scene and may monitor data entered into or communicated by the user devices assigned to the incident for other information indicative of a change in the incident (e.g., movement of a suspect to another geographic area, an escalation of severity for the incident, a report of an injury, etc.).

If no changes to the incident are detected at block 1107, the incident management and communication system 100 continues to operate based on the current role assignments and, in the example of FIG. 11, the assignment system controller 101 does not calculate any automatic role reassignments. However, if a change in the incident is detected at block 1107, the assignment system controller 101 reapplies the combinatorial optimization routine based on the updated incident information at block 1109. If, at block 1111, the automatic role assignments calculated at block 109 are the same as the automatic role assignments from the previous iteration of the combinatorial optimization routine, then the incident management and communication system 100 continues to operate based on the current role assignments. However, if the new automatic role assignments are different at block 1111, then the updated list of the user profiles assigned to the incident with the updates automatic role assignments is displayed on the user device display screen 123 at block 1113. If the role reassignment is not accepted at block 1115, then the incident management and communication system 100 continues to operate based on the current role assignments at block 1105. However, if an approval of the new role assignments is received through the user device 109 at block 1115 (including an approval of the automatic role assignments or including one or more manual changes to the automatic role assignments), the approved role reassignment is applied at block 1117 and the incident management and communication system 100 begins to operate based on the updated role assignments at block 1105. In some implementations, the application of one or more changes role assignments will cause the user device associated with a user profile that has been reassigned a new role will change its operation and the information or user interface displayed on the user device as appropriate for the newly assigned role for the associated user profile.

In the example of FIG. 11, the assignment system controller 101 is configured to reapply the combinatorial optimization routine at block 1109 only in response to detecting or receiving information or an instruction indicative of a change in the incident. However, in other implementations, the assignment system controller 101 may be configured to periodically or continually reapply the combinatorial optimization routine at block 1109 based on the current information available for the incident and is configured to transmit a notification to the user device 109 associated with the user profile of the incident manager when the automatic role assignments calculated by the assignment system controller 101 change for the incident. In some implementations, the user device 109 will then display the list of user profiles assigned to the incident including the updating automatic role assignment recommendations and prompt the user to accept the automatic role reassignments, manually change one or more of the automatic role reassignments, or, in some implementations, reject the automatic role reassignments.

In many of the examples discussed above, the list of user profiles assigned to the incident and the corresponding automatically assigned role(s) for each user profile are displayed only on a single user device 109 and, accordingly, manual reassignment of roles can only be received through that single user device 109. In some implementations, an incident manager or incident commander is assigned either automatically or manually when an incident is created and incident management and communication system 100 is configured to display the list of user profiles and automatic role assignments is displayed on the user device display screen 123 of the user device 109 associated with the user profile of the assigned incident manager. In other implementations, the role of incident manager is assigned to a user profile as part of the combinatorial optimization routine and the list of user profiles and automatic role assignments is displayed on the user device display screen 123 of the user device 109 associate with the user profile that the assignment system controller 101 has recommended for the role of incident manager.

In these implementations, only a single user device is enabled to view and manually change the automatic role assignments generated for the incident. However, in other implementations, the list of user profiles and the automatic role assignments are displayed on multiple different user devices and, in some implementations, approvals and manual changes to the automatic role assignments can be received through multiple different user devices. For example, the list of user profiles and the automatic role assignments may be displayed on every user device associated with one of the user profiles that has been assigned to the incident. In some implementation, manual changes to the automatic role assignments can be received through any of those user devices. In other implementations, each user device is only enabled to manually change the role that has been assigned to the user profile associated with the user device. The user device associated with the user profile that has been assigned the role of incident manager or incident commander then displays any received manual modifications from the other user devices and displays a prompt to approve or reject the manual role reassignment. In some implementations, a user of the user device 109 associated with the user profile that has been assigned the role of incident manager can view the relative suitability of a particular user profile for a requested manual reassignment received from another user device (e.g., through the user interface illustrated in FIG. 5B) and consider how the requested manual role reassignment will affect the other assigned roles for the incident and how it will affect the total suitability score for the incident.

In many of the examples discussed above, a suitability score is calculated for each user profile and roles are automatically assigned based on the calculated suitability scores. In some implementations, the suitability score is a raw number score calculated for each individual user profile independent of any other user profiles. The particular algorithm used to calculate this suitability score can be developed and tuned for the needs of a specific system implementation. In some implementations, a certain number of "points" are added or subtracted to the suitability score for a particular user profile based on a "checklist" for a particular role. For example, points may be added if a user profile indicates that are particular type of training or certification has been completed and points may be subtracted from the suitability score if the user profile includes a negative evaluation for previous performance in a particular role.

In other implementations, the assignment system controller 101 is configured to determine suitability scores for each user profile by applying a neural network machine learning framework. A neural network is a computational approach that is designed to solve problems in a way more similar to how a human brain operates instead of relying primarily on a series of "if-then-else" rules. A neural network is designed to include an input layer which defines the input data that will be used by the neural network to derive a solution, an output layer which provides the determined solution, and one or more hidden layers of "nodes" connecting the elements of the input layer to the elements of the output layer. A neural network is "self-training" in that the hidden layers can be updated based on a known or defined set of outputs for a given set of inputs. A neural network can be implemented on the assignment system controller 101 using, for example, a machine learning framework such as Encog or Weka, which are available for Java, .Net, and C++.

Figure 12:
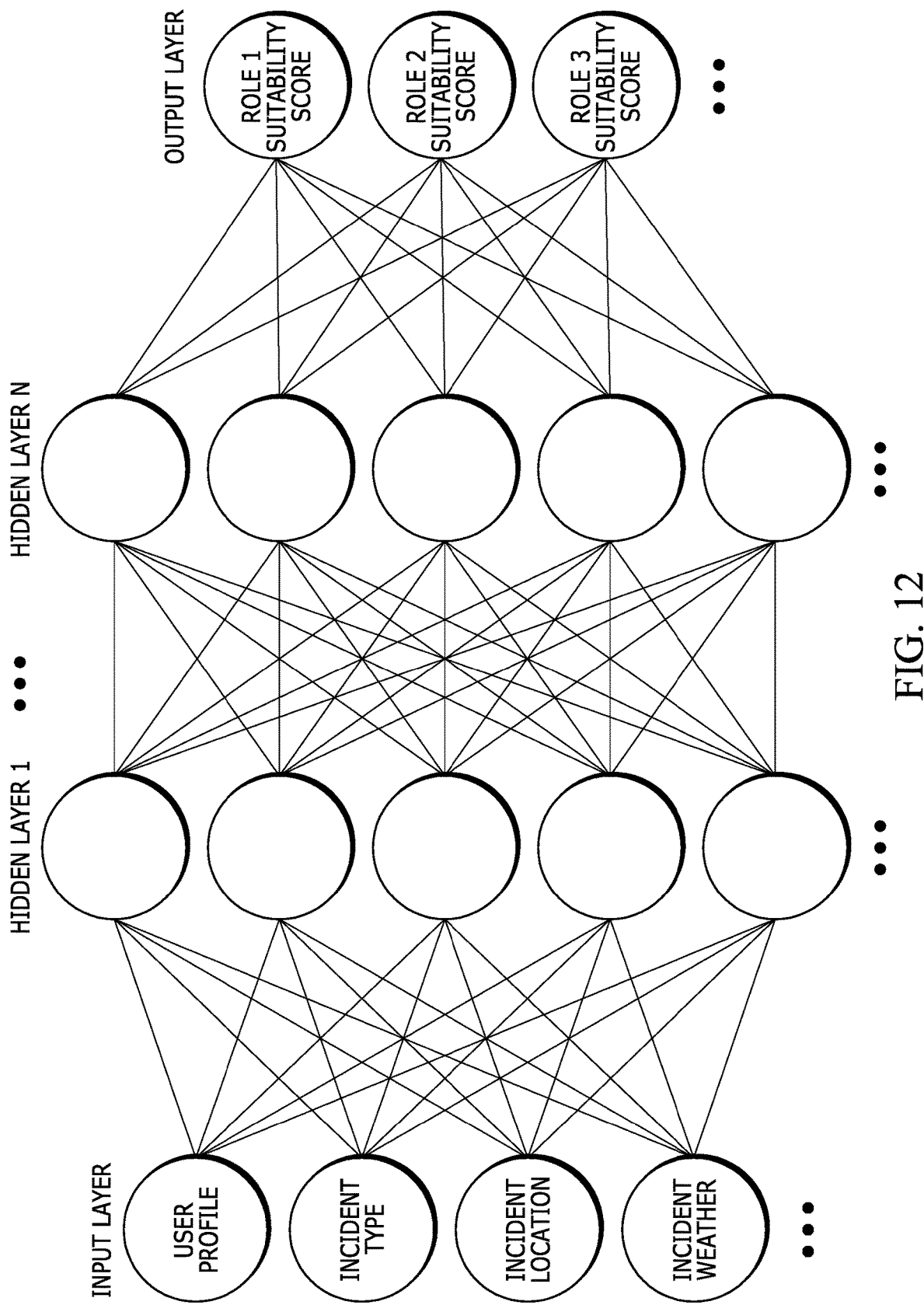
FIG. 12 is a schematic diagram of a neural network framework for determining a set of suitability scores for different roles in an incident in accordance with some embodiments.

FIG. 12 is a schematic representation of one example of a neural network machine learning framework that can be implemented by the assignment system controller 101 to determine a set of suitability scores for a user profile in an incident. There are many types of neural network frameworks, depending on the interconnectivity of the input nodes, the hidden layers, the hidden layer nodes, and the output nodes, such as Recurrent neural networks, Hopfield Networks, Boltzmann Machines, Deep Convolutional Networks, Liquid State Machines, and Deep Residual Networks, to name a few. The assignment system controller 101 accesses data records relating to a particular user profile and to the particular incident as elements of the input layer. For example, the input layer may include a numeric value indicative of the particular user profile, a numeric value indicative of the incident type, a numeric value indicative of the incident location (e.g., a current geographic distance between the user device associated with the user profile and location of the incident), and a numeric value indicative of current weather conditions at the incident scene. Using the data elements provided as the input layer, the assignment system controller 101 processes the data through the hidden layers of the neural network framework to generate an output layer that includes a set of suitability scores for each of a plurality of roles for the incident. In some implementations where the assignment system controller 101 is configured to use the same neural network for multiple incident types, the assignment system controller 101 and/or the user device 109 is configured to identify the specific role corresponding to each element (and, thereby, each determined suitability score) in the output layer of the neural network.

In the example of FIG. 12, the assignment system controller 101 is configured to determine the set of suitability scores for a particular user profile based only on data relating to the particular user profile and the particular incident. Therefore, the set of suitability scores generated by the assignment system controller 101 are generally independent of the other specific user profiles that may have been assigned to the same incident. However, in other implementations, the assignment system controller 101 may be configured to determine a set of suitability scores based not only on accessed data relating to the incident and to the individual user profile, but also based on accessed data relating to other user profiles that may have been assigned to the incident.

Figure 13:
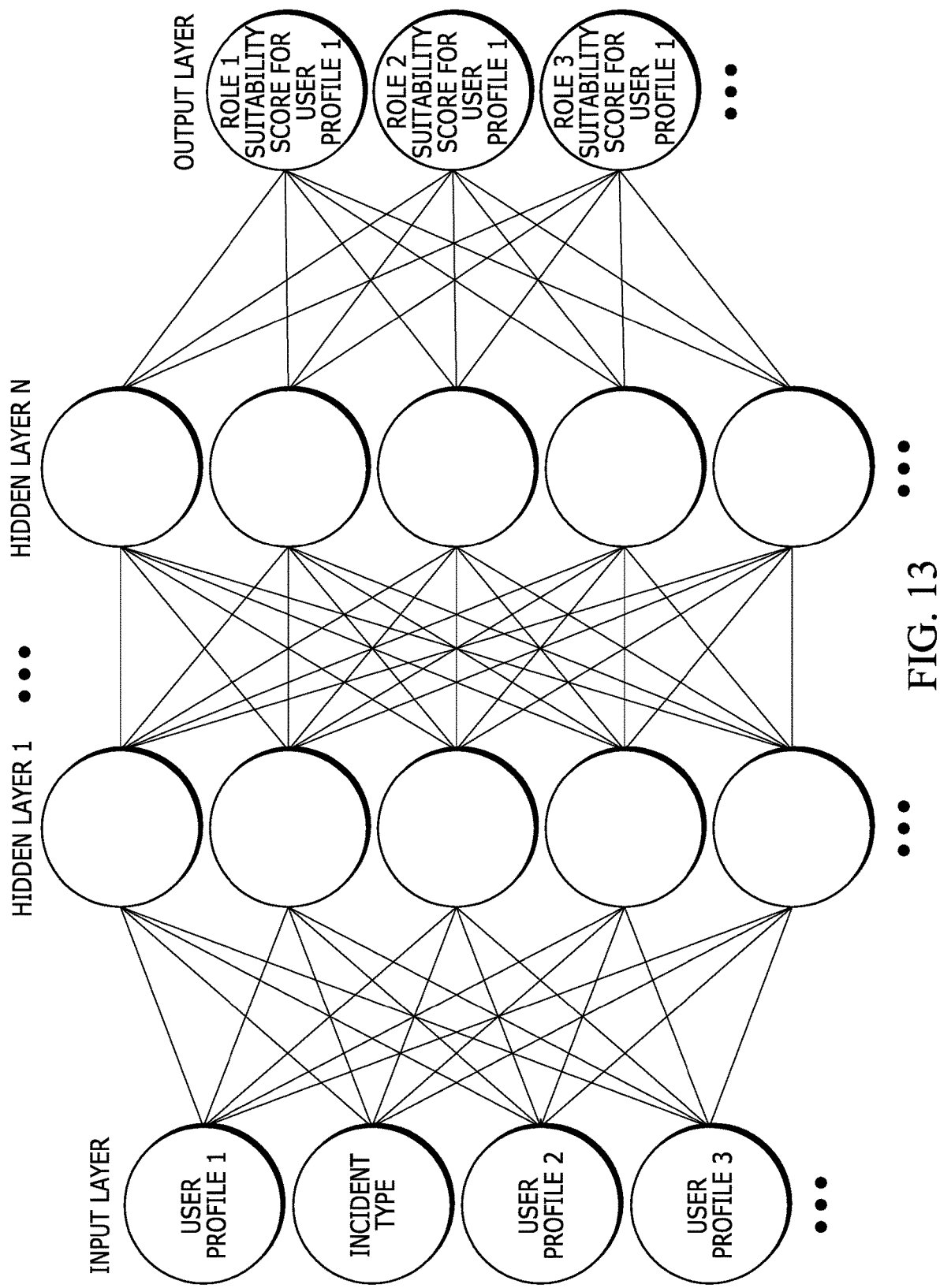
FIG. 13 is a schematic diagram of a neural network framework for determining a set of suitability scores for different roles in an incident based on other user profiles that have been assigned to the same incident in accordance with some embodiments.

FIG. 13 is a schematic representation of another example of a neural network machine learning framework that can be implemented by the assignment system controller 101 to determine a set of suitability scores for a user profile based at least in part on the other user profiles that may have been assigned to the same incident. In the example of FIG. 13, the assignment system controller 101 is configured to access as elements of the input layer a numeric value indicative of the user profile for which suitability scores are to be calculated (i.e., "User Profile 1"), a numeric value indicative of the incident type, and numeric values indicative of other user profiles which have been assigned to the incident (i.e., "User Profile 2" and "User Profile 3"). After processing these elements of the input layer through the hidden layers of the neural network framework of FIG. 13, the assignment system controller 101 outputs a set of suitability scores for each possible role in the incident as elements of the output layer.

In various implementations, a neural network framework for determining suitability scores for each user profile, such as those illustrated in FIG. 12 and FIG. 13, can be extended to other aspects of automated role assignments including the other flowcharts described above. For example, in implementations that are configured to automatically assign user profiles to an incident in order to maximize a total suitability score for one or more incidents (e.g., FIGS. 6, 7, and 8), the neural network framework of FIG. 13 may be extended to receive as elements of the input layer numeric values representative of each user profile that is available for assignment to a particular incident. Similarly, in implementations that are configured to apply multiple iterations of the combinatorial optimization routine in order to assign multiple roles to the same user profile (as in FIGS. 9 and 10), the neural network framework of FIG. 12 or FIG. 13 may be extended to receive as an element of the input layer a numeric value indicative of a "primary" role assignment when calculating a set of suitability scores for potential "secondary" role assignments. Also, in implementations where the assignment system controller is configured to consider assigning an additional or different role to a user profile that has already been assigned one or more roles in an ongoing incident (as in FIGS. 8 and 11), the neural network framework of FIG. 12 or FIG. 13 may be extended to receive as an element of the input layer a numeric value indicative of the role currently assigned to the user profile and/or a numeric value indicative of a cost or inefficiency associated with replacing the user profile with another user profile in the currently assigned role.

Neural networks can be trained by defining a set of "known" outputs for a given set of inputs. In some of the examples discussed above, the incident management and communication system 100 is configured to display a prompt on a user device 109 confirming whether the machine learning model should be retrained based on a manual reassignment of roles. In some implementations that utilize a neural network framework to determine a set of suitability scores, the assignment system controller 101 can be configured to selectively retrain the neural network based on the input received in response to the prompt. For example, in some implementations, the assignment system controller 101 is configured to apply a formula to adjust one or more of the suitability scores in the set of suitability scores for an individual user profile based on the manual role reassignment (e.g., by adding a predefined amount to the suitability score for the role to which the user profile was manually reassigned and/or subtracting a predefined amount from the suitability score for the role that was automatically assigned to the user profile). The assignment system controller 101 is configured to then use the updated set of suitability scores as the "defined" set of output elements to retrain the neural network.

In some implementations, the assignment system controller 101 is further configured to estimate the number of manual reassignments to a particular role that would be required before the neural network would be sufficiently retrained to output a suitability score that would have resulted in the role being automatically assigned to the user profile. In some implementations, the assignment system controller 101 is configured to make this estimation based on the formula used to adjust the suitability score used to retrain the neural network in response to a manual role reassignment. For example, if the assignment system controller 101 is configured to increase the suitability score by a predefined amount in the retraining data, then the assignment system controller 101 might also be configured to determine how many times that predefined amount must be added to the suitability score before the user profile would have automatically been assigned to that role. In some implementations, the estimated number of reassignments needed to retrain the neural network is displayed on the user device display screen 123 after the instruction is received through the user device 109 to retrain the neural network. In some implementations, the system presents to the user a button or other mechanism that, when selected, causes the system to process that number of retrainings of the neural network to make the role automatically assigned to this user profile on subsequent applications.

Lastly, several of the examples above mention that a recursive method such as the Hungarian method can be applied by the assignment system controller 101 to determine an optimized combination of role assignments in a reduced amount of time and with a reduced number of computations. In implementations that utilize a neural network or other machine learning framework to determine a set of suitability scores for each user profile, the assignment system controller 101 can be configured to generate a two-dimensional n×m matrix based on the determined suitability scores for each user profile where n is the number of user profiles under consideration (e.g., the number of user profiles assigned to the incident) and m is the number of available roles for the incident. As the Hungarian method is designed to determine assignments based on a lowest possible "cost," each value in the matrix is subtracted from a maximum value that is greater than or equal to the highest value in the matrix. This subtraction readjusts the matrix such that lower values are indicative of a higher suitability for a particular role.

According to the Hungarian method, assignment system controller 101 subtracts the lowest value remaining in each row of the matrix from the other values in the same row. This subtraction results in at least one "zero" value in each row of the matrix. If, at this stage, there is also at least one "zero" value in each column of the matrix and roles can be assigned to user profiles such that the assigned role for each user profile corresponds to a "zero" value in the matrix, then the Hungarian method is complete and the optimized role assignment has been determined. However, if such an assignment of roles is not yet possible, the assignment system controller 101 proceeds to subtract the lowest remaining value in each column from the other values in the same column. After this subtraction, every column includes at least one "zero" value and every row includes at least one "zero" value. The assignment system controller 101 again attempts to determine whether a combination of role assignments to user profiles can be made where the matrix includes a "zero" value for each combination of user profile and assigned role.

If a set of assignments cannot yet be determined at this stage, the assignment system controller 101 continues with further iterations of the Hungarian method by alternatingly subtracting the lowest remaining non-zero value in each row from the other remaining non-zero values in the same row and subtracting the lowest remaining non-zero value in each column from the other remaining non-zero values in the same column until a combination of role assignments to user profiles can be made where the matrix includes a "zero" value for each combination of user profile and assigned role.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-based method for assigning roles to user profiles for an incident using a neural network and output guidance for manual retraining of the neural network, the method comprising:
   identifying, by a computer-based system, a plurality of user profiles assigned to the incident;
   identifying, by the computer-based system, a plurality of roles for the incident;
   applying the neural network to each user profile of the plurality of user profiles, wherein the neural network is configured to
      receive as input stored data associated with a user profile of the plurality of user profiles, and
      produce as output a set of suitability scores indicating a relative suitability of the user profile for each role of the plurality of roles;
   automatically assigning, by the computer-based system, one or more roles of the plurality of roles to each user profile of the plurality of user profiles based at least in part on the set of suitability scores for each user profile as determined by the neural network;
   displaying on a screen the role automatically assigned to each user profile of the plurality of user profiles;
   displaying on the screen an indication of the relative suitability of a first user profile of the plurality of user profiles for each role of the plurality of roles based on the set of suitability scores produced by the neural network;
   receiving through an input device a manual reassignment selection of a different role of the plurality of roles to be assigned to the first user profile in response to displaying the indication of the relative suitability; and
   retraining, by the computer-based system, the neural network based on the manual reassignment selection, wherein retraining the neural network based on the manual reassignment selection includes
      adjusting the set of suitability scores for the first user profile based on the manual reassignment selection, wherein adjusting the set of suitability scores includes increasing the suitability score for the role of the manual reassignment selection, and
      providing the adjusted set of suitability scores as retraining data for the neural network.

2. The computer-based method of claim 1, wherein automatically assigning the one or more roles of the plurality of roles to each user profile based on the set of suitability scores for each user profile includes determining, by the computer-based system, a set of role assignments that results in a maximum total suitability score, the total suitability score including a sum of a suitability score for each user profile of the plurality of user profiles for the one or more roles assigned to each user profile.

3. The computer-based method of claim 1, further comprising accessing the stored data associated with the user profile, the stored data including one or more selected from a group consisting of training records for a user associated with the user profile, historical data indicative of the user's level of experience with the one or more roles of the plurality of roles, and performance rating data indicative of the user's prior performance in the one or more roles of the plurality of roles.

4. The computer-based method of claim 1, further comprising determining a current geographic location of a communication device associated with a user profile of the plurality of user profiles based on information from a global positioning system receiver of the communication device, and wherein the neural network is further configured to receive as input the determined current geographic location of the communication device.

5. The computer-based method of claim 1, further comprising determining, by the computer-based system, a number of retrainings of the neural network based on the manual reassignment selection that would be necessary before the role of the manual reassignment selection would be automatically assigned to the first user profile.

6. The computer-based method of claim 1, further comprising:
   determining that a condition of the incident has changed; and
   automatically updating an assignment of the one or more roles to each user profile of the plurality of user profiles by applying the neural network based on the changed condition of the incident.

7. The computer-based method of claim 6, wherein determining that the condition of the incident has changed includes determining that a user associated with a user profile assigned to the one or more roles is no longer available, and wherein automatically updating the assignment of the one or more roles includes reassigning the one or more roles currently assigned to the user profile of the unavailable user.

8. The computer-based method of claim 1, further comprising:
   automatically determining, by the computer-based system, whether two conflicting roles of the plurality of roles are assigned to the same user profile; and
   automatically reassigning at least one of the two conflicting roles to another user profile of the plurality of user profiles.

9. The computer-based method of claim 1, further comprising:
   identifying a communication device associated with a user profile of the plurality of user profiles assigned to the one or more roles for the incident; and
   modifying an operation of the communication device based on the one or more roles assigned to the user profile.

10. An incident management system comprising:
    an electronic processor configured to
      identify a plurality of user profiles,
      identify a plurality of roles for an incident,
      apply a neural network to each user profile of the plurality of user profiles, wherein the neural network is configured to receives as input stored data associated with a user profile of the plurality of user profiles and produce as output a set of suitability scores indicating a relative suitability of the user profile for each role of the plurality of roles for the incident, and
      automatically assign one or more roles of the plurality of roles to each user profile of a plurality of user profiles based at least in part on the set of suitability scores for each user profile as determined by the neural network; and
    a user interface configured to
      display an indication of the relative suitability of a first user profile of the plurality of user profiles for each role of the plurality of roles based on the set of suitability scores produced by the neural network, and
      receive a manual reassignment selection of a different role of the plurality of roles to be assigned to the first user profile in response to displaying the indication of the relative suitability,
    wherein the electronic processor is further configured to retrain the neural network based on the manual reassignment selection by
      adjusting the set of suitability scores for the first user profile based on the manual reassignment selection, wherein adjusting the set of suitability scores includes increasing the suitability score for the role of the manual reassignment selection, and
      providing the adjusted set of suitability scores as retraining data for the neural network.

11. The incident management system of claim 10, wherein the electronic processor is configured to automatically assign the one or more roles of the plurality of roles to each user profile based on the set of suitability scores for each user profile by determining a set of role assignments that results in a maximum total suitability score, the total suitability score including a sum of a suitability score for each user profile of the plurality of user profiles for the one or more roles assigned to each user profile.

12. The incident management system of claim 10, wherein the electronic processor is further configured to access the stored data associated with the user profile, the stored data including one or more selected from a group consisting of training records for a user associated with the user profile, historical data indicative of the user's level of experience with the one or more roles of the plurality of roles, and performance rating data indicative of the user's prior performance in the one or more roles of the plurality of roles.

13. The incident management system of claim 10, wherein the electronic processor is further configured to determine a current geographic location of a communication device associated with a user profile of the plurality of user profiles based on information from a global positioning system receiver of the communication device, and wherein the neural network is further configured to receive as input the determined current geographic location of the communication device.

14. The incident management system of claim 10, wherein the electronic processor is further configured to determine a number of retrainings of the neural network based on the manual reassignment selection that would be necessary before the role of the manual reassignment selection would be automatically assigned to the first user profile.

15. The incident management system of claim 10, wherein the electronic processor is further configured to
    determine that a condition of the incident has changed, and
    automatically update an assignment of the one or more roles to each user profile of the plurality of user profiles by applying the neural network based on the changed condition of the incident.

16. The incident management system of claim 15, wherein the electronic processor is configured to determine that the condition of the incident has changed by determining that a user associated with a user profile assigned to the one or more roles is no longer available, and wherein the electronic processor is configured to automatically update the assignment of the one or more roles by reassigning to another user profile the one or more roles currently assigned to the user profile associated with the user that is no longer available.

17. The incident management system of claim 10, wherein the electronic processor is further configured to
   automatically determine whether two conflicting roles of the plurality of roles are assigned to the same user profile, and
   automatically reassign at least one of the two conflicting roles to another user profile of the plurality of user profiles.

18. The incident management system of claim 10, wherein the electronic processor is further configured to
   identify a communication device associated with a user profile of the plurality of user profiles assigned one or more roles for the incident; and
   modify an operation of the communication device based on the one or more roles assigned to the user profile.

19. A computer-based method for assigning combinations using a neural network and providing output guidance for manual retraining of the neural network, the method comprising:
   identifying, by a computer-based system, a first set of data items;
   identifying, by the computer-based system, a second set of data items;
   applying a neural network to each data item of the first set of data items, wherein the neural network is configured to
      receive as input stored data associated with a data item from the first set of data items, and
      produce as output a set of suitability scores indicating a relative suitability of the data item from the first set of data items for combination with each data item from the second set of data items;
   automatically assigning, by the computer-based system, a data item from the second set of data items to each data item from the first set of data items based at least in part on the set of suitability scores for each data item from the first set of data items as determined by the neural network;
   displaying on a screen the data item from the second set of data items automatically assigned to each data item from the first set of data items;
   displaying on the screen an indication of the relative suitability of a first data item from the first set of data items for combination with each data item from the second set of data items based on the set of suitability scores produced by the neural network;
   receiving through an input device a manual reassignment selection of a different data item from the second set of data items to be assigned to the first data item from the first set of data items in response to displaying the indication of the relative suitability; and
   retraining, by the computer-based system, the neural network based on the manual reassignment selection, wherein retraining the neural network based on the manual reassignment selection includes
      adjusting the set of suitability scores for the first data item from the first set of data items based on the manual reassignment selection, wherein adjusting the set of suitability scores includes increasing the suitability score for the data item from the second set of data items selected as the manual reassignment selection, and
      providing the adjusted set of suitability scores as retraining data for the neural network.

\* \* \* \* \*